US005579064A

United States Patent [19]
Vetter

[11] Patent Number: 5,579,064
[45] Date of Patent: Nov. 26, 1996

[54] COMPACT ANAMORPHIC MOTION PICTURE SYSTEM

[76] Inventor: Richard Vetter, 17627 Camino de Yatasto, Pacific Palisades, Calif. 90272

[21] Appl. No.: 528,732

[22] Filed: Sep. 15, 1995

Related U.S. Application Data

[63] Continuation-in-part of Ser. No. 221,036, Mar. 31, 1994, which is a continuation-in-part of Ser. No. 807,056, Dec. 12, 1991, abandoned.

[51] Int. Cl.⁶ .......................... G03B 19/18; G03B 21/32
[52] U.S. Cl. ............................ 352/38; 352/40; 352/44; 352/85
[58] Field of Search .................... 352/38, 40, 44, 352/85

[56] References Cited

U.S. PATENT DOCUMENTS

| | | | |
|---|---|---|---|
| 1,829,633 | 10/1931 | Chretien | 354/94 |
| 1,829,634 | 10/1931 | Chretien | 352/239 |
| 2,890,622 | 6/1959 | Wallin | 359/670 |
| 3,143,033 | 8/1964 | Shearer | 352/44 |
| 3,165,969 | 1/1965 | Gunn | 355/77 |
| 3,583,803 | 6/1971 | Cole | 352/239 |
| 3,637,297 | 1/1972 | Yoshida | 352/38 |
| 3,865,738 | 2/1975 | Lente | 352/44 |

Primary Examiner—Michael L. Gellner
Assistant Examiner—Mathew Miller
Attorney, Agent, or Firm—Freilich Hornbaker Rosen

[57] ABSTRACT

A method is described for producing Cinemascope-type motion picture images that have a large aspect ratio (e.g. 2.35 to 1), which enables their high quality projection using moderately priced projection lenses, which produces a steadier projected image, and which increases the life of the release print while reducing its cost. A scene is photographed in the prior art manner, using an anamorphic lens to produce 50% horizontally compressed anamorphic camera film frame images (aspect ratio of about 1.175 to 1). During processing to produce a release print, another anamorphic lens is used to produce 36.5% vertically compressed anamorphic release print film frame images (aspect ratio of 1.85 to 1) of the camera film images. An anamorphic projection lens is used in a motion picture theater to horizontally expand the projected images by about 27% (to an aspect ratio of 2.35 to 1). The fact that the anamorphic projector lens horizontally expands the image by only 27%, instead of the 100% of the prior art, enables the projection of extremely sharp and undistorted images on a screen, using a moderately priced anamorphic lens. The fact that the release prim images have been vertically compressed, results in their convenient use in current projectors, in the use of less film for each release print, in a longer lifetime of use for each release print, and in a steadier image. Each release print film frame occupies 2.5 perforations instead of 4, which results in a steadier projected image.

6 Claims, 3 Drawing Sheets

COMPACT ANAMORPHIC MOTION PICTURE SYSTEM

CROSS REFERENCE TO RELATING APPLICATION

This is a continuation-in-part of U.S. patent application Ser. No. 08/221,036, filed Mar. 31, 1994, now pending which is a continuation-in-part of Ser. No. 07/807,056, filed Dec. 12, 1991 now abandoned.

BACKGROUND OF THE INVENTION

There are two standard wide screen aspect ratios in current use in commercial motion picture theater exhibition. One format is the Wide Screen Academy Format which was adopted in the 1950's, which is sometimes referred to as the "Flat" format (because it uses a spherical lens without a cylindrical anamorphic lens). The projected area in the Flat format has an aspect ratio of 1.85:1, and accounts for about 70% of all commercial theater projection. Present original cameras (in-the-field and studio cameras) that photograph in the Flat format, take camera film frames that each have a height of slightly less than 4 perforations and that have an aspect ratio of about 1.33:1. The entire area of each film frame can be used in television broadcast, which currently uses an aspect ratio of 1.33:1. For motion picture theater projection, only about 60% of the height of each film frame is projected, to produce an aspect ratio of 1.85:1 on a theater screen.

In the practice of the system called Cinemascope, or Scope (aspect ratio of 2.35:1), the original camera uses a high quality anamorphic lens which produces a camera film image that is horizontally compressed by 50%. Almost the same camera film frame size (4 perforations high and same width) is used as when photographing in the Flat format, except that in the Scope format the aspect ratio of the photographed image, or original scene, is reduced by half from 2.35:1 to 1.175:1. Release Scope prints are made, whose film frames are identical to those of the original (but edited) camera frames. In a theater, an anamorphic projection lens is used to project the images of the Scope frames onto a theater screen. The projection lens produces a horizontal expansion of 100%, so the projected image has an aspect ratio of 2.35:1, even though the film frame image has an aspect ratio of only 1.175:1. The Scope process has the advantage that substantially the entire height of the camera-photographed film frames are used (instead of only about 60% as for the 1.85:1 aspect ratio of the projected area in the Flat format) so the Scope process can potentially produce a satisfactory image across a larger projection screen width. A limiting factor in the use of the Scope process is that an expensive anamorphic projection lens would be required to produce a good projected Scope image. Lenses are subject to large amounts of astigmatism, linear image distortion, chromatic aberration, and other aberrations. The aberrations are potentially very large where an anamorphic lens must produce a large horizontal or vertical compression or expansion. In order to obtain a high quality projected image of a prior Scope film, an expensive anamorphic projection lens would be required. In practice, anamorphic lenses of moderate cost (e.g. $1800) are used, which produce a wide image of only moderate quality. In addition, if a theater is to project Scope images (0.700 inch high) as well as Flat images (0.446 inch high), a separate primary lens is required for each (each primary projection lens costs about $1200). The Scope format has been limited to about 30% of theatrical projection.

SUMMARY OF THE INVENTION

In accordance with one embodiment of the present invention, a method is provided for producing wide, or large aspect ratio, motion picture images, which creates an enhanced projected image at low overall cost. The camera may use an expensive anamorphic lens (placed over the existing primary camera lens) to produce high quality anamorphic camera film images despite the use of a large horizontal compression of the image such as by 50%. However, instead of projecting an exact copy of the anamorphic camera film images, the height of the film frames is reduced (vertically compressed) during processing. The width of the film frames remains the same, so the entire available width on 35 mm film stock is still used. The vertical compression results in anamorphic release prints for projection, which require only a moderate horizontal expansion such as 25%. High quality processing lenses are used along with very high resolution intermediate and release prim film, to produce a very high quality release print. The fact that the anamorphic projection lens has to produce only a moderate horizontal expansion, enables a moderately priced anamorphic projection lens to be used (which is mounted over an existing primary projection lens), to obtain a very high quality projected image. Also, only a single primary projection lens is required, because the film frame image height is the same for the new wide format as for the current Flat format.

The projector preferably uses smaller diameter sprocket wheels than previously, which is facilitated by the fact that the release prim is moved in smaller steps due to the shorter film frames. Applicant finds that the smaller diameter sprocket wheel generally results in less "jumping" of the projected image, to produce a higher quality projected image. This is achieved using less film stock in each release print, while producing a longer lifetime of use for each release print.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
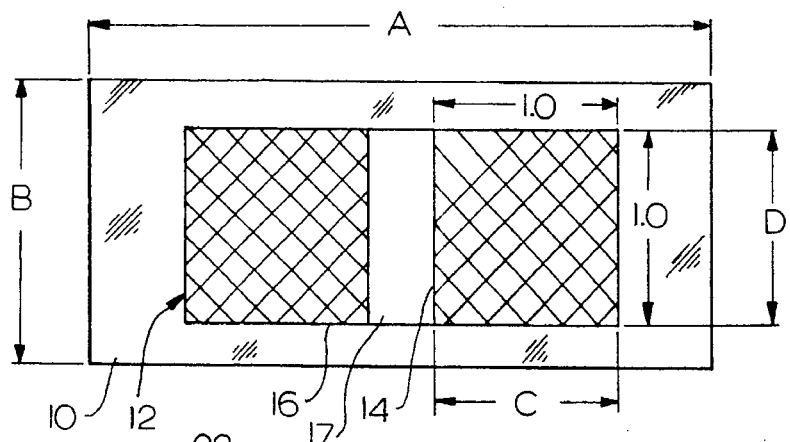
FIG. 1 is a front elevation view representing a scene to be photographed and showing the appearance of a film frame whose images are geometrically similar to those of the scene.

FIG. 1 shows a photographed image, or scene 10 of large aspect ratio that is to be photographed and projected, with the particular scene 10 having an aspect ratio of 2.35:1. That is, the width A of the scene is 2.35 times as great as the height B of the scene. The scene is shown as containing an image 12 that includes two squares 14, 16 that each have a width C and height D of one unit, and that also includes a region 17. The entire image 12 also has an aspect ratio of 2.35:1.

Figure 2:
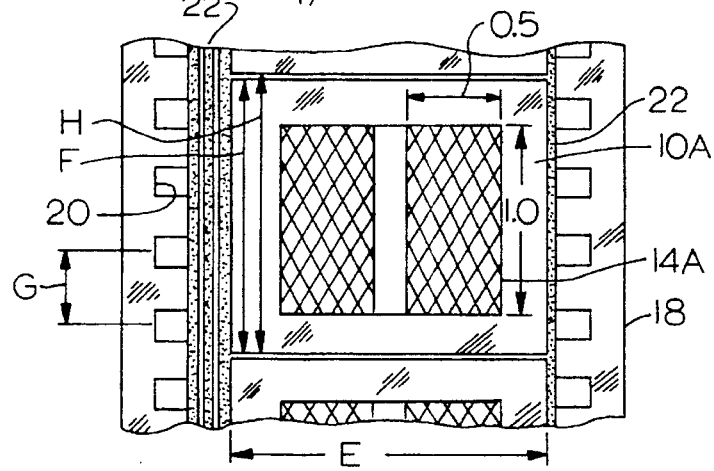
FIG. 2 is a front elevation view of a portion of a camera film showing a camera film frame and an image thereon representing the scene of FIG. 1, where the film frame and image have been horizontally compressed by 50%.

FIG. 2 shows a strip 18 of standard 35 mm film stock which has been exposed to contain film frames. If the film frame images were not anamorphic, but were geometrically similar to the scene being photographed, then each film frame would contain only the middle portion of the scene (opposite sides cropped). Such cropped film frames that are not anamorphic are called Academy Standard, or the "Flat" format, which has generally been used for commercial theater release prints between the 1920's and the present. In the Flat format, each film frame has a width E of 0.868 inch and a length or height F of about 0.735 inch which is somewhat less than the length of 4 sprocket holes or perforations 20 of the film stock. Only about 60% of the height of each film frame is actually projected. The film stock has two rows of perforations 20, with a center-to-center distance G between perforations being 0.1866 inch. The film frames are spaced apart by a distance H of 4 perforations, or 0.7464, or substantially 0.75 inch, inch.

The film strip of FIG. 2 actually contains film frames 22 with images 10A produced by the Cinemascope or Scope process. In the Scope process, the film frame images are anamorphic, in that they are not geometrically similar to an undistorted view of the screen. The frames are of about the same height as for the Flat format, and are also spaced by 4 perforations. The image 10A has been horizontally compressed by 50% so it is anamorphic, but it contains the entire scene 10 without cropping of the sides. It is noted that the image of the compressed square at 14A has a length of 1 unit and a width of 0.5 unit as a result of the 50% horizontal compression. Each Scope film frame 22 has an aspect ratio (E/H) of 1.175 to 1, or about 37%.

In processing the camera film, the camera film is edited, a contact interpositive duplicate film is made, and the interpositive is duplicated (by photographing with a processing camera) to produce an internegative. The internegative is laid against film stock for contact printing of release prints. In the prior art for both the. Scope and Flat formats, the images on the release prints were identical to those of the original camera film frames. For theater projection of the Scope process, wherein the photographed images had been horizontally compressed by 50%, an anamorphic projection lens was required which horizontally expanded the tall image by 100% (to convert from the 1.175 to 1 aspect ratio for the camera film frame image 10A of FIG. 2 to the 2.35:1 screen aspect ratio of the projected image 10C). Because of the large horizontal expansion required, the anamorphic projection lens (cost of about $1800) produced a projected image that was not of only moderate quality.

The difficulty of manufacturing an anamorphic lens with very small aberrations, depends upon the expansion or compression that is required, with the difficulty increasing as the expansion or compression ratio increases. If one can reduce the amount of horizontal expansion that the anamorphic projection lens must produce, then a sharper projected image can be obtained using a projection lens of only moderate cost.

Figure 3:
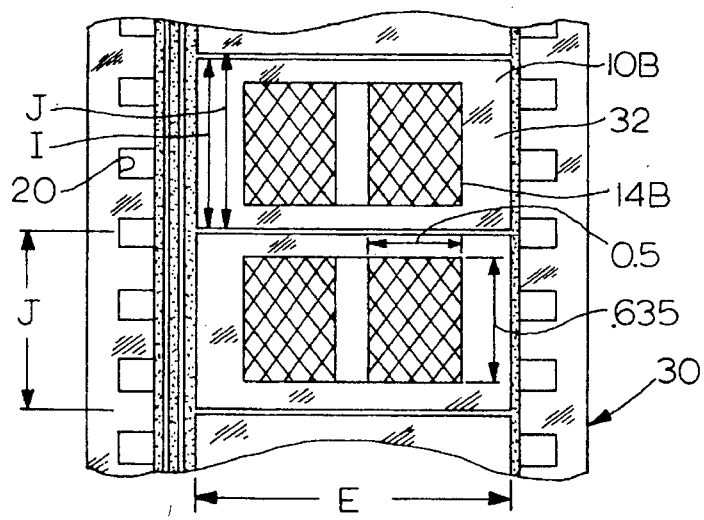
FIG. 3 is a front elevation view of a portion of a release print, containing film frames with images representing those of the camera film of FIG. 2, except that each film frame and the images thereon of FIG. 3 are vertically compressed by 37.5% from those of the camera film of FIG. 2.

In accordance with the present invention, applicant processes the original horizontally compressed camera film frame images 10A (FIG. 2), to vertically compress them, to produce a release print 30 shown in FIG. 3. In the release print 30, each release print film frame 10B has been vertically compressed, as compared to the camera film frames images 10A. That is, while each release frame 32 has the same width E as each camera film frame 22, each release frame 32 has a much smaller height or length I. The aspect ratio has been changed from 1.175:1 to 1.85:1. Applicant prefers that the length I of each release frame 32 be about equal (or slightly less) to the distance J between 2.5 perforations 20. The release print 30 is obtained by vertically compressing each camera film frame 22 and the image 10A thereon by 36.5%, or about 37%. The image 14B of the original square, now has a width of 0.5 units and a height of 0.635 units. Each release frame 32 has an aspect ratio of 1.85 to 1. Each release print image is anamorphic, in that it is not geometrically similar to the original scene, but it must be horizontally expanded by an anamorphic lens to produce a geometrically similar image. A geometrically similar image (not anamorphic) is commonly referred to as a flat image. Substantially all areas of the camera film frame images are present in the release print image (i.e. there is substantially no cropping).

The width E and height I of each compressed anamorphic release print frame 32 is substantially identical to the width and height of the area of Flat release print frames that are projected onto theater screens. Thus, the same projector primary lens can be used to project the compressed frame 10B, with the addition of an anamorphic attachment lens.

Figure 4:
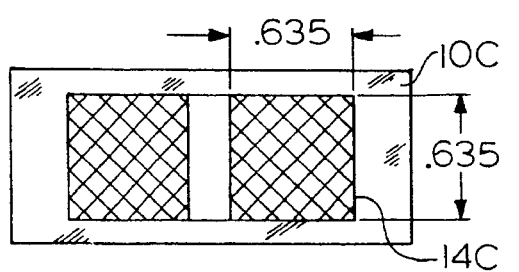
FIG. 4 represents a projected image that has been projected from using the release print of FIG. 3, but with the film frames and the images thereon being horizontally expanded by 25%.

The release print film frame images 10B are projected onto a screen with the use of an anamorphic projection attachment lens which produces a horizontal expansion of 27%. This results in the projected image shown at 40C in FIG. 4, which has an aspect ratio of 2.35:1. The square 14C is indicated as having a width and height that are each 0.635 units. Of course, the actual size of the projected image would be much larger than the one illustrated in FIG. 4, but the projected image would still be geometrically similar (i.e. undistorted, or flat) to the original scene 10 of FIG. 1 that was photographed by the camera.

Figure 5:
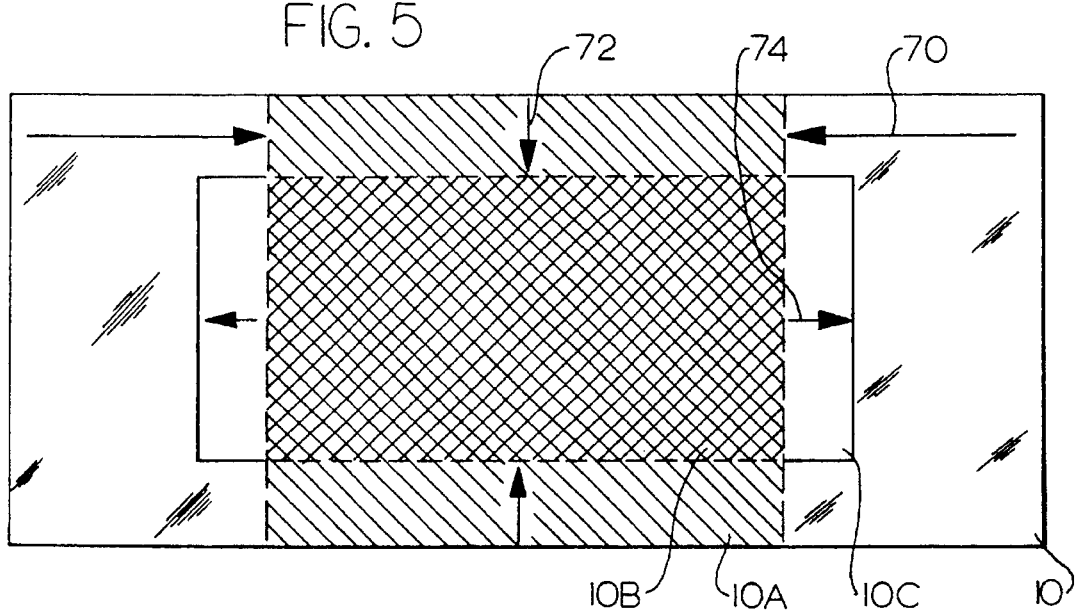
FIG. 5 is a diagram that indicates the various compressions and expansions produced with the method of the present invention.

FIG. 5 is a summary of the processes that occur in photographing a scene 10 and producing a projected image 10C on a theater screen. The original scene 10 has an aspect ratio of 2.35:1. When a camera photographs the scene, its anamorphic camera lens produces a camera film frame 10A which is horizontally compressed by 50%, as indicated by arrows 70. The camera film frame image is used to make an interpositive (by contact printing), and a processing lens is used in a processing camera to produce internegative film frame images 10B by a 36.5% vertical compression, indicated by arrows 72. The internegative film frame images and corresponding release print images 10B have an aspect ratio of 1.85:1. A theater projector lens horizontally expands the image during projection, by 27%, as indicated by arrows 74, to produce a projected image 10C having an aspect ratio of 2.35:1, which is the same as the original scene 10. Of course, the projected image 10C is normally greatly magnified so that it fills a theater screen.

The anamorphic release print image 10B will represent an undistorted view of a real life scene, if the release print image is vertically expanded by 60% (from 2.5 to 4 perforations) and then horizontally expanded by 100% (the equivalent of a 27% horizontal expansion). Instead of using release print images each occupying (or spaced apart) 2.5 perforations, which is a noninteger number, it would be possible to have release print images each occupying the closest higher integer, of 3 perforations. If each release print image occupied 3 perforations, it would require a vertical expansion of about 33% (from 3 to 4 perforations), followed by a horizontal expansion of 100% (the equivalent of a 50% horizontal expansion) to produce an undistorted image. One disadvantage of 3 perforations, is that present primary projection lens and film gates cannot be used, as they are intended to project images of a height of about 2.5 perforations. One advantage of 3 perforations is that it simplifies the use of registration pins during processing.

The present cost for a high quality anamorphic camera lens attachment which produces a horizontal compression of 50%, is about $25,000. The anamorphic lens (a cylindrical lens) is usually placed over the existing spherical projection lens. The cost for an anamorphic projection lens or attachment of the same quality, which produces a horizontal expansion of 100%, would be about the same (about $25,000). In the past, lower cost and lower quality anamorphic projection lenses were used. The high cost of the prior art anamorphic projection lenses and the fact that the projected images were not of the highest quality, reduced the use of the Scope format or process (or any very wide angle process, which is where the projected image aspect ratio is at least 2 to 1). In the present system, the anamorphic projection lens has to produce only a 25% horizontal expansion, instead of the 100% expansion of the prior art. As a result, a high quality anamorphic projection lens, of about the same quality as the $25,000 camera lens which produces a 50% horizontal compression, can be obtained for less than $1000.

In order to obtain a clear projected image, using the release print film frames 32 of reduced height I, it is necessary that each release print film frame 32 have a very high resolution. Motion picture release film stock is currently readily available which can produce a resolution of about 130 line pairs per millimeter. A major problem in degradation of the image is in converting the camera film frames 22 (FIG. 2) to the release print film frames 32 (FIG. 3), as this requires the production of an interpositive from the camera negative, the production of an internegative from the interpositive, and the production of release prints from the internegative. Previously, each step resulted in degradation of the image. Eastman Kodak Company now provides type 5244 intermediate film stock which has a resolution capacity of more than 130 line pairs per millimeter, which is far superior to the previous resolution capacity of about 56 line pairs per millimeter for intermediate film stock. It is noted that Eastman Kodak Company recently received an Academy Award Oscar (in 1994) for this great improvement. This intermediate stock costs considerably more per foot than camera film or release print stock. Applicant uses this very high resolution intermediate stock, with a very high quality processing lens to produce the internegative from the interpositive (applicant's lens cost $80,000, even though it has to produce a vertical compression of only 37.5%). The high cost of one or two lenses used in processing, does not result in a large overall cost, as compared to the cost for thousands of theater projection lenses. Thus, by using the high resolution intermediate and release print stocks that are available, and by using only moderate horizontal expansion during theater projection, applicant is able to project a superior high aspect ratio motion picture image.

Film used by motion picture cameras has a resolution that is commonly 80 line pairs per mm. Although higher resolution film is available, such higher resolution film requires considerably more light and is therefore not as practical. Release print film stock commonly has a resolution that is more than 20% greater than originating camera motion picture film stock, with release print stock commonly having a resolution of at least 130 line pairs per mm (which is at least 60% greater). Although originating camera film is very "slow" (requires a lot of light to properly expose), sufficient light is readily available in contact printing so a higher resolution film stock can be readily used. Until recently, available intermediate film stock had a resolution of only 56 line pairs per mm. Intermediate film stock (used for both the interpositive and the internegative) has low contrast, which is necessary to counter the strong tendency of contrast increase, and conversion of greys to black or white as copies are made (an interpositive from the original camera film, an internegative from the interpositive, and a release print from the internegative). The previous 56 line pairs per mm resolution of intermediate stock previously was a major reason why a large release print (e.g. 4 perfs frame length) was required for moderate clarity.

Figure 9:
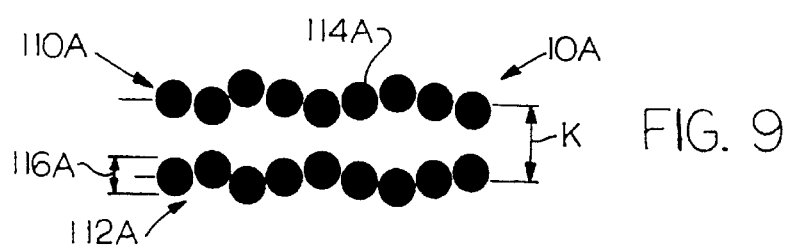
FIG. 9 is a greatly enlarged view of a portion of the camera film image of FIG. 2, showing a line pair on film having a resolution of 80 line pairs per min.

Applicant realizes that with high resolution intermediate (and release print) film stock being available, a major limiting factor in achieving a clear projected image, is now the resolution of the original camera film. FIG. 9 is a greatly enlarged view of a portion of the original camera image 10A, showing a pair of lines 110A, 112A formed by exposed film grains 114A which are each indicated by circles. The grains 114A represent the grains of camera film that has a resolution of 80 line pairs per mm and are indicated as having a diameter and height 116A (which is 0.00625 mm). In FIG. 9, the lines are separated by the distance K (which is 2×0.00625=0.0125 mm).

Figure 10:
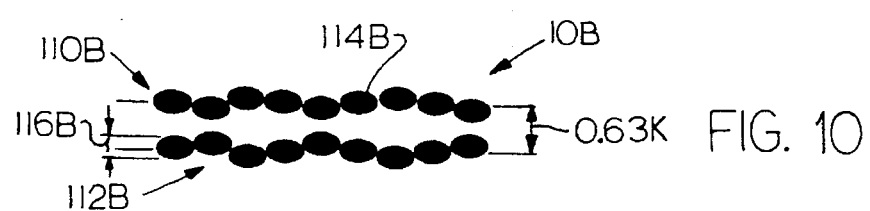
FIG. 10 is a greatly enlarged view of a portion of the release print film image of FIG. 3, showing a line pair on film having a resolution of 130 line pairs per mm.

FIG. 10 is a similarly enlarged view of a portion of the release print image 10B (vertical compression to 63% of camera film frame height) showing the same pair of lines 110B, 112B. The smaller distance 0.63K between the lines is due to the vertical compression of the image. However, since the grains 114B each have a height 116B about 60% of the size of the camera film grains 114A (80/130=62%), the line pair 110B, 112B is still distinguishable.

Figure 11:
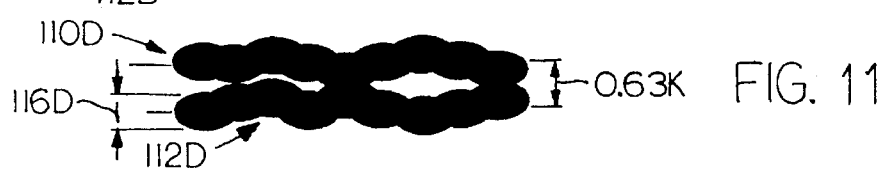
FIG. 11 is a view showing how the view of FIG. 10 would appear on film having a resolution of 80 line pairs per mm.

FIG. 11 shows the situation where the distance 0.63K between line pairs is reduced 63% from that of FIG. 9, but film of the same resolution of 80 line pairs per mm is used. It can be seen that the lines 110D, 112D cannot be readily distinguished. If the film resolution is only the 56 line pairs per mm of previous intermediate stock, then the image would be even worse. Thus, applicant can take advantage of the current high resolution of intermediate (and release print) film stock, to produce 63% vertically compressed release print film frames (each 2.5 perf height) carrying the same information as prior 4 perf high frames. The reliance on high film resolution requires applicant to use a very high quality processing lens (to make the vertically compressed interpositive from the internegative), to avoid image blurring.

As discussed above, the release frame 32 of FIG. 3 has an aspect ratio (E/J) of 1.85 and a height J of 2.5 perforations. There are considerable advantages in the use of release print film frames 32 (FIG. 3) having an aspect ratio of about 1.85:1, with each film frame occupying a film length I that is slightly less than 2.5 perforations. One advantage is that almost all motion picture theater projectors have film gates mask apertures that are designed to project images of a height slightly less than the height J of 2.5 perforations. By providing anamorphic film frames of a height slightly less than 2.5 perforations, applicant reduces the amount of projector modification required to project his release print film frames 32 using common theater projectors. The amount of film that is used is reduced by having each frame occupy 2.5 perforations instead of 4 perforations. Also, because the film is moved at a lower speed (2.5 perforations, instead of 4 perforations, every 1/24th second) and the film is subjected to a lower acceleration and deceleration, the release print has a longer lifetime of use. It is noted that the film is moved (by 4 or 2.5 perforations) to the film gate in 1/96th second, and remains at the film gate for 3/96th second (while it is flashed twice).

Figure 8:
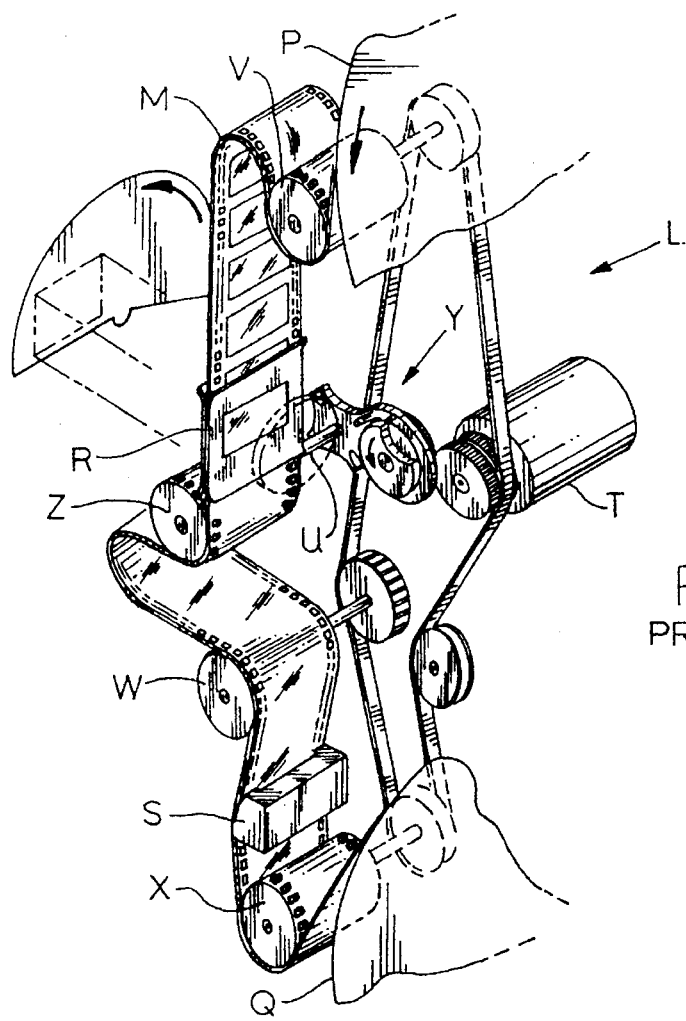
FIG. 8 is an isometric view of a theater projector of the prior art.

FIG. 8 illustrates a prior art film projector L. Film M moves from a supply reel P through a film gate R and past a sound head S, to a takeup reel Q. A constant speed motor T drives sprocket wheels V, W, X at a constant speed. The motor T is also connected through a Geneva mechanism Y to a shaft U on which a sprocket wheel Z is mounted. The Geneva mechanism is supposed to turn the sprocket wheel by precisely 90° every 24th of a second. The sprocket wheel Z moves prior art Flat film intermittently by a distance of 4 perforations every 24th of a second, to pull it intermittently through the film gate R. The Geneva mechanism wears, which results in it moving the film by slightly more or less than 90° in each step.

Figure 6:
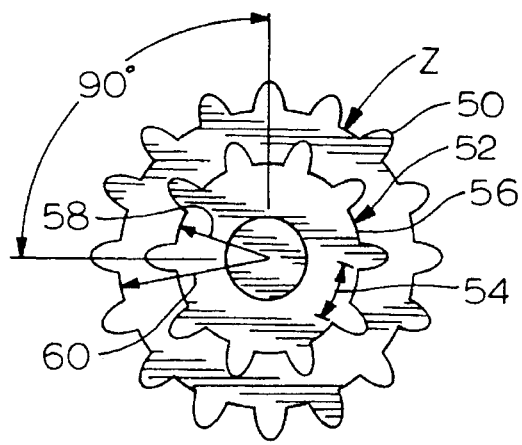
FIG. 6 is a side elevation view showing a projector sprocket wheel of the prior art and of the present invention.

FIG. 6 shows that the prior art sprocket wheel Z has 16 sprocket teeth 50, so that every quarter turn (90°) of the wheel Z advances the film by a length of 4 perforations. Applicant substitutes a new sprocket wheel 52 that has 10 teeth, for the prior wheel Z. The wheel 10 has a noninteger number of teeth (2.5) per 90°. The distance 54 between the bases of the sprockets on the new sprocket wheel 52 is the same as the distance for the previous sprockets 50. With 10 sprocket teeth, the sprocket wheel 52 advances the film by 2.5 perforations every 24th of a second. The sprocket wheels each have less than 12 perforations but more than 8 perforations, and in each rotational step the wheels turn by an angle (90°) equal to the distance between two sprocket teeth plus a fraction of the distance between two sprocket teeth.

Another important advantage to the use of frames 2.5 perforations long, is that applicant finds that when the release print 30 of FIG. 3 is projected, there is usually less frame jump than for previous Scope or Flat formats. Frame jump is the term applied to the fact that successive images projected on a theater screen are located slightly higher or lower. When a release print image 32 (FIG. 3) of 0.446 inch height I (and 0.4675, or about 0.47 inch, inch between successive frames) is projected onto a screen having a 15 foot height, then a jump in the film frame of 0.0005 inch results in a jump of the image on the screen of nearly one-quarter inch. Such jumping detracts from the quality of the projected image.

Figure 7:
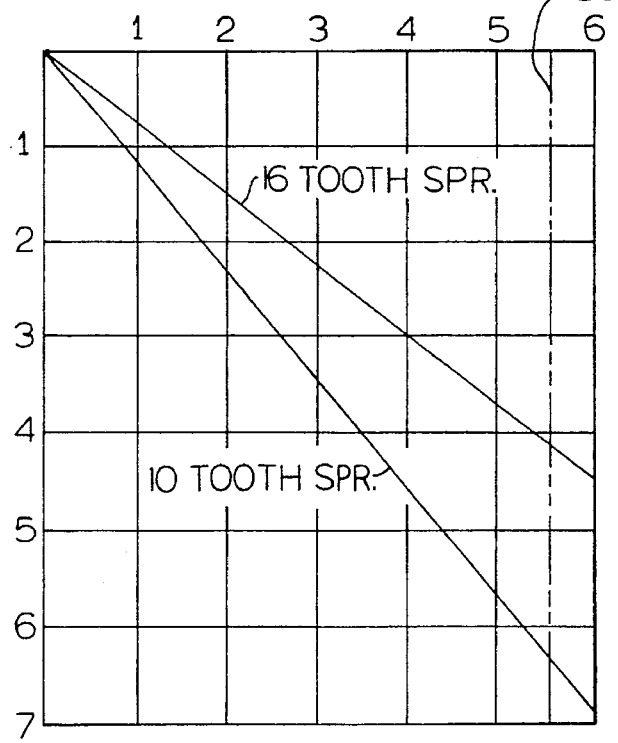
FIG. 7 is a graph showing variation in frame jump with rotational deviation, for the sixteen tooth and ten tooth sprocket wheels of FIG. 6.

Applicant believes that the decrease in film jumping with 2.5 perforation spacing, is due to the effect of wear in the Geneva mechanism of film projectors. As described above, the Geneva mechanism determines the position of the film frames. The vertical jump of a film frame is equal to the angular jump (deviation from 90°) of the sprocket wheel times the radius of the wheel (times a constant). FIG. 6 shows that the radius 58 (0.30 inch) for applicant's new smaller sprocket wheel 52, at the film-supporting surface 56 of the wheel, is less than the radius 60 (0.48 inch) for the prior sprocket wheel Z used for 4 perforation film frames. Thus, a given angular deviation caused by the Geneva mechanism results in a smaller vertical jump for applicant's smaller radius sprocket wheel. FIG. 7 shows how, for a given deviation in rotation (which might be caused by Geneva mechanism wear) the projected film frame image may jump. The Society of Motion Picture and Television Engineers has a "premium standard" of a maximum jump of one-eighth of one percent of the screen image height. Translated to film jump in the projector gate, the maximum deviation is 0.00056 inch, which is indicated by line 80 in FIG. 7. It can be seen that it requires a much greater rotational deviation (6.4 arc minutes) to reach this maximum for the sprocket wheel 52 of FIG. 6, than for the wheel Z.

In any case, applicant finds that the film jump is generally reduced considerably, by about 40%, which results in an enhanced projected image. It may be noted that cameras (both original cameras that photograph a scene, and processing cameras that produce an interpositive) use registration pins to precisely position the film, instead of relying solely on a Geneva mechanism.

Applicant finds that the projection of the film also results in a reduced frequency of image weave. In weave, the projected image shifts small distances, continuously from one side of the screen to the other. One standard is a maximum side-to-side weave of 1/5th of 1% of the width of the projected image. Where a previous projected image might shift a quarter inch every 3 seconds, applicant's projected image might shift a quarter inch every 5 seconds. The less rapid weaving makes the weaving less apparent. Applicant believes that this reduction is due to the fact that his film moves at a lower speed of 56.1 feet per minute due to each frame occupying 2.5 perforations, compared to the standard of 89.76 feet per minute where each film frame occupies 4 perforations.

Applicant also believes that the projected image is sharper due to less film flutter (slight movement along the projection axis, so the film moves into and out of focus) caused by intense heat on the film frame. This appears related to the use of a smaller frame size.

As mentioned above, applicant finds that film wear of the 2.5 perforation release prim is reduced and the release print life is extended. This is due to reduced acceleration and deceleration of film during the intermittent pull down cycle, wherein only 2.5 perforations are advanced during the standard 1/96th second time frame, instead of 4 perforations. Laboratory testing shows about a 60% increase in the life of release prints.

It is common practice in motion picture theaters to accommodate both Flat and Scope picture formats, using a common screen height with movable side masking of the screen to achieve both 1.85:1 and 2.35:1 aspect ratios. The current aperture heights for Flat and Scope projection are different (0.446 inch for Flat and 0.700 inch for Scope). It is therefore currently necessary to employ two prime projection lenses of different focal lengths for the two screen formats. The present invention allows use of a single prime lens for projection of both Flat and Scope formats since the new film frame heights and current projector aperture heights are identical. The only lens change for projecting a Scope image, is to use an anamorphic lens over the primary (spherical) lens, to horizontally expand the image by 27%. Also, where Flat images of a height of slightly less than 2.5 perf-spacings, are distributed on film with images spaced at 2.5 perf spacings, the same projector transport mechanism can be used for advancing the Flat film as for the Scope film.

As mentioned above, instead of vertically compressing the camera film images by 36.5% to produce film frames spaced by 2.5 perforations, it is possible to vertically compress them by 25% to produce film frames spaced by 3 perforations. This results in the need for an anamorphic projection lens to produce a horizontal expansion of about 50%. A moderate cost anamorphic projection lens for 50% expansion does not produce as high a quality projected image as a corresponding lens for 25% expansion, but the quality of the projected image is still higher than one for 100% expansion. One problem with the projection of film frames 3 perforations high, is that a larger film gate and a second primary projection lens would be required.

Applicant has developed the Scope process using a vertical compression of 36%, so the splices on the original camera film do not show. As a result, applicant has used a horizontal expansion for the projection lens, of 27%. A horizontal expansion of about 27% (20% to 30%) is preferred. A vertical compression of about 36.5% (34% to 38%) is also preferred.

Thus, the invention provides a method for producing a wide aspect ratio (preferably at least 2 to 1 and usually 2.35 to 1) projected image on a motion picture theater screen, where the projected image is of high quality and yet can be produced at a modest cost. The cost for projection lenses that will produce a very high quality image, is reduced by providing release print frames of moderately large aspect ratio (e.g. 1.85 to 1), so the projection lens must produce only a moderate horizontal expansion. This allows the use of moderately priced anamorphic projection lenses to produce high quality images. The resolution of the projected images obtained with applicant's 2.5 perforation high film frames, is at least equal to that previously obtained using 4 perforations high release print images, by the use of a very high quality processing lens and very high resolution processing film. Use of the new Scope film format with present theater projectors is facilitated because the width and height of the new Scope film frames to be projected is the same as the width and height of Flat film frames that are currently projected by the projectors. As a result, the only large modifications required to allow use of present projectors that are set up for projecting current Flat films, is to change the sprocket wheels, as from sixteen tooth to ten tooth wheels, and to add an anamorphic lens (to the current spherical primary projection lens) to horizontally expand the projected image by 27%. The new Scope process reduces the amount of film stock required in each release print by ⅝ or about 40%. Applicant finds that the new Scope process results in the release prints lasting much longer than previous release prints. Also, applicant finds that the projected image is generally steadier in that it has less jump and weave, which enhances it over the prior Scope images.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for producing a large width-to-height ratio image on a motion picture theater screen, by photographing a scene to produce an original camera film image, processing the film to produce a release print, and projecting the release print onto a screen, wherein:

said step of photographing includes using an anamorphic camera lens to produce horizontally compressed anamorphic camera film frame images of the scene on originating camera film, with said camera film frame images each having a predetermined aspect ratio of width divided by height;

said step of processing includes using an anamorphic lens to produce vertically compressed anamorphic release print film frame images of said camera film images on release print film, wherein said anamorphic release print film frame images each have a larger aspect ratio than said anamorphic camera film frame images and with said release print film frame images each containing substantially all areas of said camera images, so the percent of horizontal expansion required during projection to project a geometrically similar image of the scene, is reduced, and wherein said release print film has a higher resolution than said originating camera film.

2. The method described in claim 1 wherein:

said step of processing to produce said release print film frames, includes vertically compressing said camera frame images sufficiently, that the horizontal expansion of said release print film frames required during projection is at least 20%, but is no more than 50% of the horizontal expansion that would be required to project a geometrically similar image of said scene from said horizontally compressed anamorphic camera film frame images of the scene.

3. The method described in claim 1 wherein:

said step of photographing includes horizontally compressing the image of the scene being photographed by about 50%, and producing film frames each of about 0.868 inch width and having an aspect ratio of about 1.17 to 1 on film stock, with said film frames spaced by substantially 0.75 inch;

said step of processing includes vertically compressing the camera frame images by about 36.5% to produce a release print with film frames each having an aspect ratio of about 1.85 to 1 and occupying substantially 0.47 inch length of film stock, and said step of projecting includes horizontally expanding the image on said release print by about 27%.

4. A method for producing a motion picture image of a scene, comprising:

using a precise camera anamorphic lens to photograph the scene and produce anamorphic original camera film frames on camera film stock, containing images that are horizontally compressed images of the photographed scene and that have a much smaller aspect ratio than that of the area of the scene which was photographed;

using a precise processing anamorphic lens to produce vertically compressed intermediate anamorphic images of the images of said original camera film frames on intermediate film stock having a resolution more than 20% greater than the resolution on said camera film stock, and using said intermediate images to produce anamorphic release print images on release print film stock having a resolution more than 20% greater than the resolution on said camera film stock, where said anamorphic release print images have an aspect ratio greater than that of said camera film frame images, but less than that of the photographed area of the scene;

using a moderate cost projection lens to project horizontally expanded undistorted motion picture images of said release print images;

said processing lens is chosen so the horizontal expansion required to project said release print images to produce projected motion picture images that are substantially undistorted and therefore flat images of said scene, is no more than half that which would be required to project said camera film frame images to produce undistorted projected motion picture images of said photographed area of said scene.

5. The method described in claim 4 wherein:

said step of photographing to produce original camera film frames includes producing original camera film images on 35 mm film stock, where the frames are spaced apart by about 0.75 inch and with each original camera film image representing an image of the scene being photographed, but that has been horizontally compressed by 50% and that has an aspect ratio of about 1.17 to 1;

said step of producing release print images includes producing release print images that are spaced apart by about 0.47 inch and that have an aspect ratio of about 1.85 to 1, with each release print image representing an original camera film image that has been vertically compressed by about 37%.

6. A motion picture release print which includes a strip of 35 mm film having at least two rows of perforations and which has a multiplicity of film frames spaced along the length of the film strip, wherein:

each film frame contains an image, with said images being spaced apart by about 0.47 inch and with each image being anamorphic but, if horizontally expanded by an amount which is between 20% and 30% represents an undistorted view of a real life scene.

\* \* \* \* \*